G. BROCKE.
VALVE.
APPLICATION FILED AUG. 24, 1910.

1,016,064.

Patented Jan. 30, 1912.

2 SHEETS—SHEET 1.

WITNESSES

INVENTOR
G. Brocke.

G. BROCKE.
VALVE.
APPLICATION FILED AUG. 24, 1910.

1,016,064.

Patented Jan. 30, 1912.

2 SHEETS—SHEET 2.

WITNESSES

INVENTOR
G. Brocke,
by
Attorneys.

UNITED STATES PATENT OFFICE.

GERHARD BROCKE, OF ALLEGHENY, PENNSYLVANIA.

VALVE.

1,016,064.  Specification of Letters Patent.  Patented Jan. 30, 1912.

Application filed August 24, 1910. Serial No. 578,674.

*To all whom it may concern:*

Be it known that I, GERHARD BROCKE, a citizen of the United States of America, residing at Allegheny, in the county of Allegheny and State of Pennsylvania, have invented certain new and useful Improvements in Valves, of which the following is a specification, reference being had therein to the accompanying drawing.

This invention is an improvement upon my Patent No. 916,262, granted March 23, 1909.

The present invention has for its object to provide an equally balanced two-way or three-way hydraulic valve that can be used for various purposes, the valve being positive in its action, free from injury by ordinary use and efficient for the purposes for which it is intended.

I attain the above object by a mechanical construction consisting of comparatively few parts easily and quickly assembled and maintained in an operatable condition, the valve being particularly designed for exceedingly high pressures and the parts thereof arranged whereby the pressure within the valve cannot displace any of the valve parts.

The invention will be hereinafter specifically described and then claimed, and reference will now be had to the drawings, wherein:—

Figure 1:
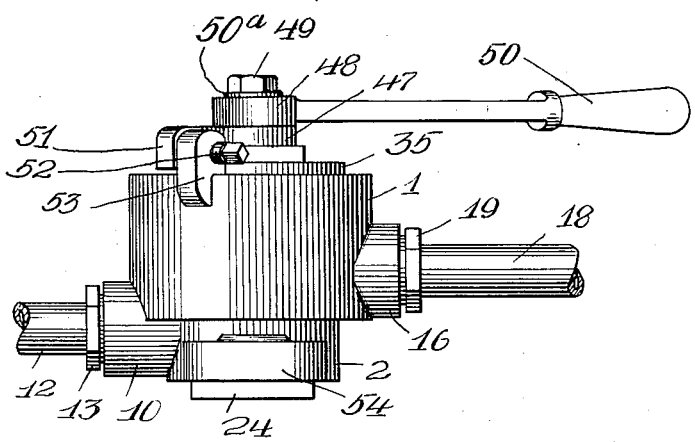
Figure 2:
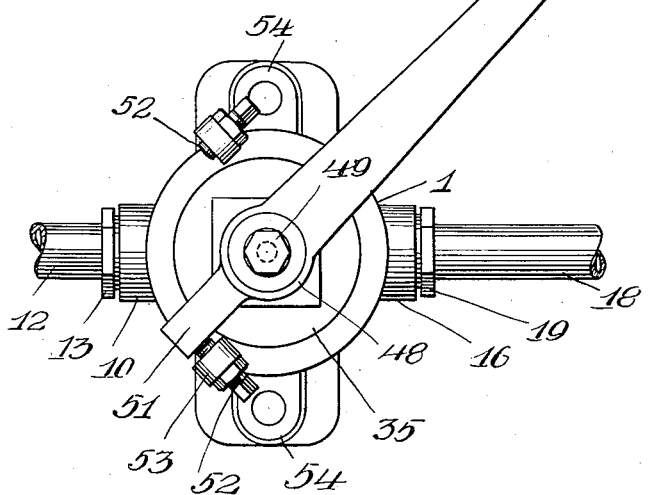
Figure 3:
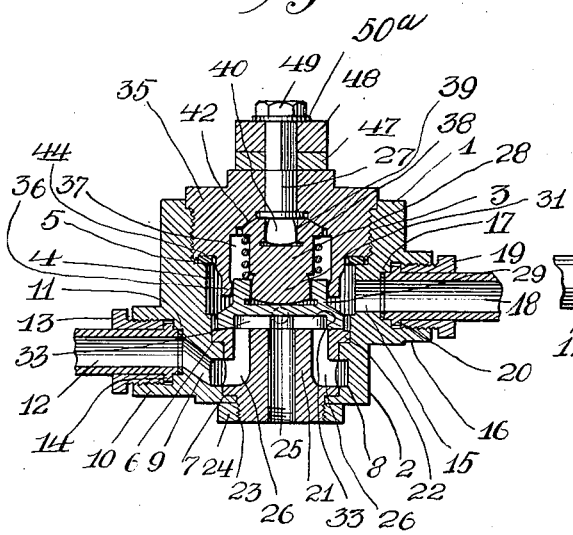
Figure 4:
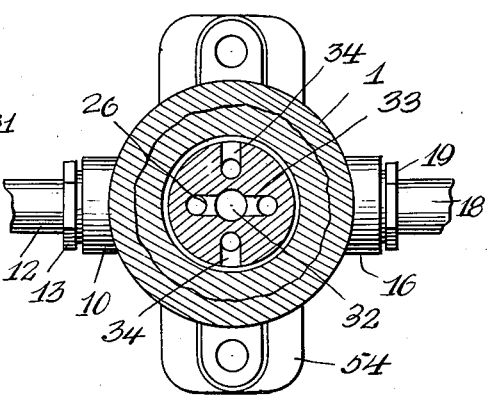
Figure 5:
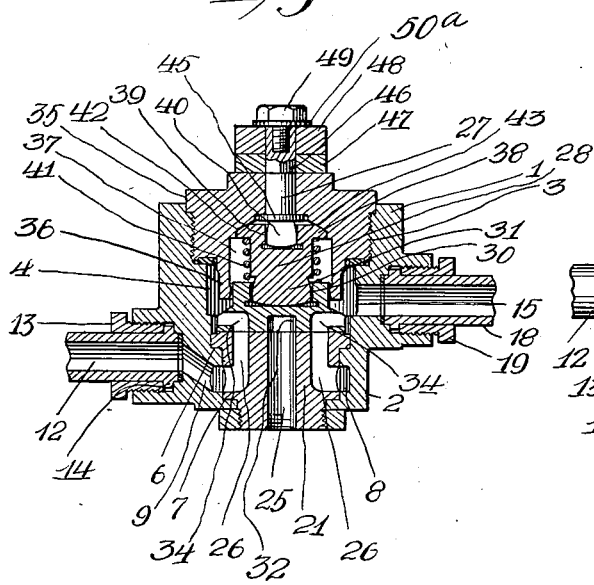
Figure 6:
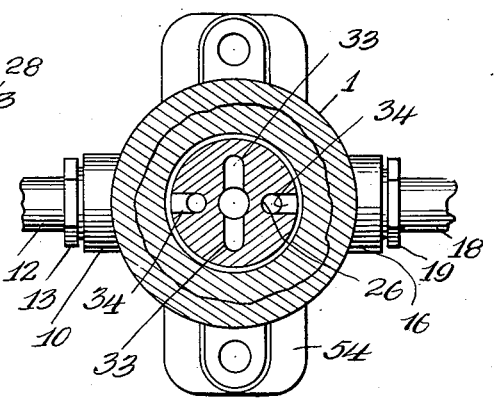

Figure 1 is a side elevation of the valve, Fig. 2 is a plan of the same, Fig. 3 is a vertical sectional view of the valve showing the same in an exhaust position, Fig. 4 is a horizontal sectional view of the valve in an exhaust position, Fig. 5 is a vertical sectional view of the valve in a charging position, and Fig. 6 is a horizontal sectional view of the same.

In the accompanying drawings 1 denotes a cylindrical valve body having the lower end thereof reduced, as at 2. The valve body 1 is provided with a vertical stepped bore, said bore being gradually stepped from the upper end of the body to the lower end thereof to provide a cap socket 3, an equalizing chamber 4, an annular gasket seat 5, an annular plug seat 6 and a plug socket 7. The walls of the plug socket 7 are provided with an annular groove 8 and communicating with said groove through the medium of an angularly disposed port 9 is a nipple 10 formed integral with the reduced end 2 of the valve body 1. In the nipple 10 is mounted a gasket 11 and an outlet pipe 12, said pipe being retained therein by a gland 13 screwed in the nipple and engaging a peripheral flange 14, carried by the inner end of the pipe 12.

Communicating with the equalizing chamber 4 through the medium of a port 15 is a nipple 16 formed integral with the valve body 1, and mounted in said nipple is a gasket 17 and the end of an inlet pipe 18, said pipe being retained therein by a gland 19 screwed in the nipple to engage a peripheral flange 20, carried by the inner end of the inlet pipe 18.

Mounted in the socket 7 at the lower end of the bore is a plug 21 having the upper end thereof provided with a collar 22 resting upon the seat 6 and the lower end thereof reduced and threaded, as at 23 to receive a nut 24 employed for retaining the plug 21 in the valve body 1. The plug 21 is provided with a vertical exhaust port 25 and with two diametrically opposed angular ports 26, said ports establishing communication between the annular groove 8 and the top of said plug.

Rotatably mounted in the upper part of the valve body 1 is a sectional valve stem, comprising a stem 27, a coupling piece 28 and a shiftable member 29. The shiftable member rests upon the upper end of the plug 21 and extends into the equalizing chamber 4. This member has the upper end thereof reduced and provided with a socket 30 to receive the lower reduced end 31 of the coupling piece 28, this reduced end being shaped whereby the shiftable member 29 can shift upon the lower end of the coupling piece and find its own level or seat upon the top of the plug 21. The bottom of the member 29 is provided with a central cavity 32 and communicating with said cavity are two diametrically opposed grooves 33 adapted to establish communication between the angular ports 26, the cavity 32 and the exhaust port 25. The bottom of the shiftable member is also provided with two angular ports 34, these ports being disposed at right angles to the groove 33 and are adapted to establish communication between the equalizing chamber 4 and the angular ports 26.

The walls of the cap socket 3 are threaded to receive a cap 35, said cap having the lower end thereof reduced, as at 36 and provided with an annular recess 37 to receive the upper end of the shiftable member 29, the end of said member loosely fitting in the recess 37. The recess 37 houses the coupling piece 28, and the upper end of said coupling piece is provided with an annular flange 38 and with a socket 39 to receive the lower reduced end 40 of the stem 27. Encircling the coupling piece 28 within the recess 37 is a coiled compression spring 41, said spring normally retaining the upper beveled edges 42 of the annular flange 38 seated against the dome-shaped roof 43 of the recess 37, also normally retaining the shiftable member 29 in engagement with the top of the plug 21.

Interposed between the cap 35 and the seat 5 and embedded in a groove in the cap 35 is a gasket 44 adapted to prevent a leakage between the valve body 1 and the cap 35 by the pressure forcing the gasket against the walls of the groove.

The stem 27 is retained in the cap by a collar 45 engaging the roof 43 of the recess 37, also by the upper rectangular end 46 of said stem, upon which is mounted first, a stop-finger 47 having the finger thereof bent downwardly, as at 51; second, an operating lever 48 having a suitable handle 50, and third, a washer 50ª. These elements are retained upon the upper end of the stem by a screw 49. By making the stop-finger 47 and the lever 48 of two separate pieces, the lever can be fitted at an angle to the stop-finger if necessary. The depending end of the stop-finger 47 is adapted to impinge adjustable stops 52, carried by lugs 53 formed integral with the valve body 1 and limit the movement of said operating lever. When the stop-finger 47 engages one of the adjustable stops, the valve is in a charging position and when engaging the other stop it is in an exhaust position. With the lever intermediate the stops 52 the valve is in a closed or locked position.

The lower end of the valve body 1 is provided with oppositely disposed apertured lugs 54 whereby the valve can be secured to a suitable support.

Operation:—When the operating lever 48 is moved, the sectional valve stem is moved to either control the passage of water, steam or air from the pipe 18 to the pipe 12 or from the pipe 12 to the exhaust port 25. With the sectional valve stem in the position shown in Fig. 3 of the drawings, the water-steam or air can pass from the pipe 12, through the port 9, groove 8, angular ports 26, grooves 33, cavity 32 to the exhaust port 25, and when the valve is in the position shown in Fig. 5, the water, steam or air passes from the pipe 18, through the port 15 into the equalizing chamber 4, through the angular ports 34 of the shiftable member 29 into the angular ports 26 of the plug 21, into the groove 8 and through the port 9 into the pipe 12. In the first mentioned position, the cylinder or pipe 12 can exhaust and in either position the cylinder or pipe 12 is charged. It is during the latter position that the pressure of water, steam or air equally balances the shiftable member 29 within the equalizing chamber 4 and assists in perfectly seating said member upon the upper end of the plug 21. It is also the pressure of water, steam or air that forms a non-leakable connection between the upper end of the coupling piece 28 and the cap 35, thus preventing any leakage around the stem 27.

I attach considerable importance to the sectional valve stem, particularly the manner in which the sections are connected together, which permits of the coupling piece 28 and the shiftable member 29 adjusting themselves to perfectly seat upon the upper end of the plug 21 and against the roof 43 of the cap 35. Besides the pressure maintaining these sections properly seated, the spring 41 assists the pressure in this connection.

It will of course be understood that when the grooves 33 are in communication with the angular ports 26, that the angular ports 34 of the shiftable member 29 are blanked by the top of the plug 21, and that the valve in its entirety is made of strong and durable metal capable of withstanding the high pressure of water, steam or air which passes through the same.

What I claim is:—

1. A valve of the type described, comprising a body, said body having an equalizing chamber formed therein, said body having an inlet port in communication with said chamber, a plug mounted in the lower end of said body, said plug having an exhaust port formed therein, said plug having oppositely disposed angular ports formed therein, said body having an outlet port formed therein in communication with the angular ports of said plug, a cap mounted in the upper end of said body, a shiftable member mounted upon the top of said plug, said member having grooves formed therein adapted to establish communication between the ports and the exhaust port of said plug, said shiftable member having angular ports formed therein and adapted to establish communication between said chamber and the angular ports of said plug, a coupling piece loosely connected to the top of said shiftable member, a stem rotatably mounted in said cap and loosely connected to the upper end of said coupling piece, and means interposed between the upper end of said coupling piece and the upper end of said shiftable member for normally retaining said member seated upon the upper end of said plug, and the upper end of said coupling piece seated against said cap.

2. A valve of the type described, comprising a body, said body having an equalizing chamber formed therein, said body having an inlet port in communication with said chamber, a plug mounted in the lower end of said body, said plug having an exhaust port formed therein, said plug having oppositely disposed angular ports formed therein, said body having an outlet port in communication with the angular ports of said plug, a cap mounted in the upper end of said body, a shiftable member mounted upon the top of said plug, said member having grooves formed therein adapted to establish communication between the ports and the exhaust port of said plug, said shiftable member having angular ports formed therein adapted to establish communication between said chamber and the angular ports of said plug, a coupling piece loosely connected to the top of said shiftable member, a stem rotatably mounted in said cap and loosely connected to the upper end of said coupling piece, means interposed between the upper end of said coupling piece and the upper end of said shiftable member for normally retaining said member seated upon the upper end of said plug, and the upper end of said coupling piece seated against said cap, and means adapted to facilitate the rotation of said stem.

3. A valve of the type described, comprising a body, said body having an equalizing chamber formed therein, said body having an inlet port in communication with said chamber, a plug mounted in the lower end of said body, said plug having an exhaust port formed therein, said plug having oppositely disposed angular ports formed therein, said body having an outlet port in communication with the angular ports of said plug, a cap mounted in the upper end of said body, a shiftable member mounted upon the top of said plug, said member having grooves formed therein adapted to establish communication between the ports and the exhaust port of said plug, said shiftable member having angular ports formed therein and adapted to establish communication between said chamber and the angular ports of said plug, a coupling piece loosely connected to the top of said shiftable member, a stem rotatably mounted in said cap and loosely connected to the upper end of said coupling piece, means interposed between the upper end of said coupling piece and the upper end of said shiftable member for normally retaining said member seated upon the upper end of said plug, and the upper end of said coupling piece seated against said cap, means adapted to facilitate the rotation of said stem, and means including adjustable stops for limiting the movement of said stem.

In testimony whereof I affix my signature in the presence of two witnesses.

GERHARD BROCKE.

Witnesses:
Geo. E. Webb,
Geo. A. Young.